Nov. 24, 1936.　　　B. SLIPIKAS　　　2,061,640
PARACHUTE FOR AIRPLANES
Filed Sept. 9, 1933　　　2 Sheets-Sheet 1

INVENTOR
Benjamin Slipikas
BY
ATTORNEY

INVENTOR
Benjamin Slipikas
BY
ATTORNEY

Patented Nov. 24, 1936

2,061,640

UNITED STATES PATENT OFFICE 2,061,640

PARACHUTE FOR AIRPLANES

Benjamin Slipikas, Brooklyn, N. Y.

Application September 9, 1933, Serial No. 688,703

2 Claims. (Cl. 244—21)

This invention relates to improvements in airplanes, and it is the principal object of this invention to provide an airplane with a parachute which automatically opens if the speed of the airplane sinks below a certain speed and closes again automatically if this speed is attained or increased.

Another object of this invention is the provision of a parachuted airplane in which the fabric of the parachute is supported by flexible and adjustable ribs and consists of overlapping parts to permit it to assume, when inflated, about the same shape as assumed by an ordinary parachute as for instance used by a single person.

Still another object of my invention is the provision of a parachute for airplanes in which an auxiliary propeller operates the spring controlled contacts of switches for automatically closing the motor circuits for either opening or closing the parachute.

A further object of the invention is the provision of an airplane equipped with a parachute and an automatically operating cut-off for stopping the motor as soon as the parachute is fully opened or closed.

A still further object of the invention is the provision of a parachuted airplane equipped with a hand controlled switch to open or close the parachute operating circuit in case the automatic control fails to act.

These and other objects and advantages of the invention will become more fully known as the description thereof proceeds and will then be specifically defined in the appended claims.

In the accompanying drawings forming a material part of this specification:

Figure 1:
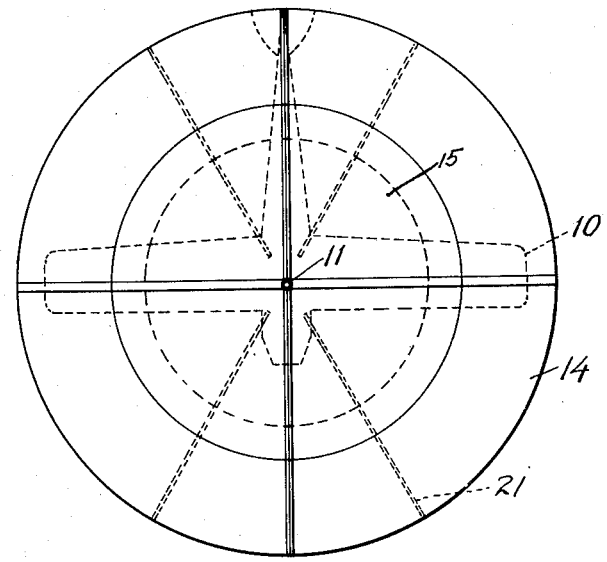
Fig. 1 is a top plan view of a parachuted airplane constructed according to the present invention.
Figure 2:
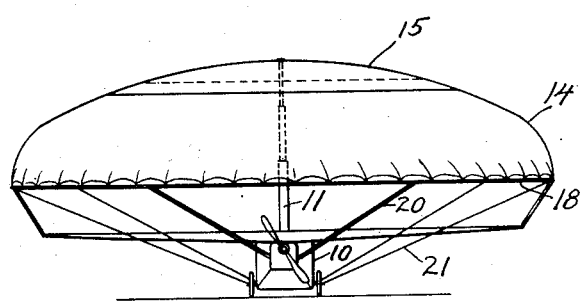
Fig. 2 is a front elevation thereof.

As illustrated in Figures 1 to 5, the airplane 10 of any desired construction and type carries on its fuselage a telescoping mast 11 to the upper end of which the ribs 12 are attached at their inner ends, and while I have shown four, any suitable number may be used.

The ribs 12 are preferably formed from flat thin material stripes so as to make them flexible. They consist of a plurality of parts connected by metal bands 13 to permit adjustment.

The parachute fabric is made in two parts 14, 15 overlapping at their inner ends to permit lengthening and attached to the ribs 12 by lacing, as indicated at 16.

Figure 5:
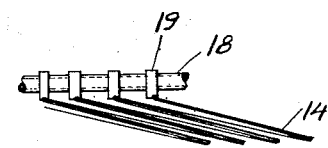
Fig. 5 is a fragmentary end view illustrating how the parachute folds.
Figures 3, 4:
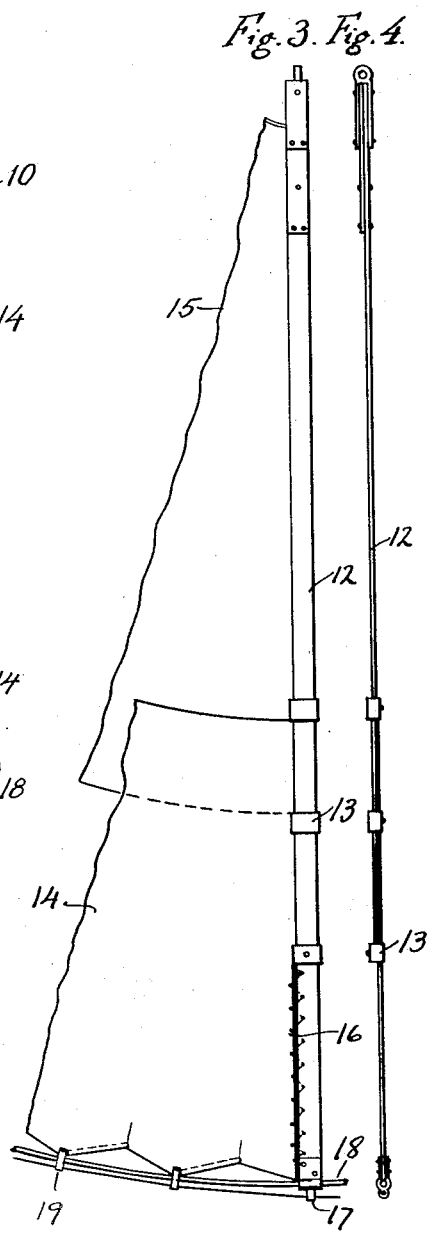
Fig. 3 is a fragmentary detail view of the parachute and one of its ribs.
Fig. 4 is an edge view of one of the ribs.

To the outer ends of the ribs, are secured eyes 17 through which a large tubular ring 18 is guided, and the outer edge of the parachute fabric has attached thereto at certain intervals eyes 19 through which the ring 18 is passed to allow a folding of the parachute as indicated in Figure 5.

The ring is attached to the plane and held in place by means of the struts 20 and cables 21.

In Figures 6 to 10 the operating mechanism for automatically folding and unfolding the parachute is illustrated, the electric motor 22, by the intermediary of a gear 23 rotates a shaft 24 journaled in suitable bearings supported in a frame 25. The shaft 24 carries intermediate its ends a cable drum 26 upon which the cables for opening and closing the parachute are secured and wound.

Figures 7, 8:
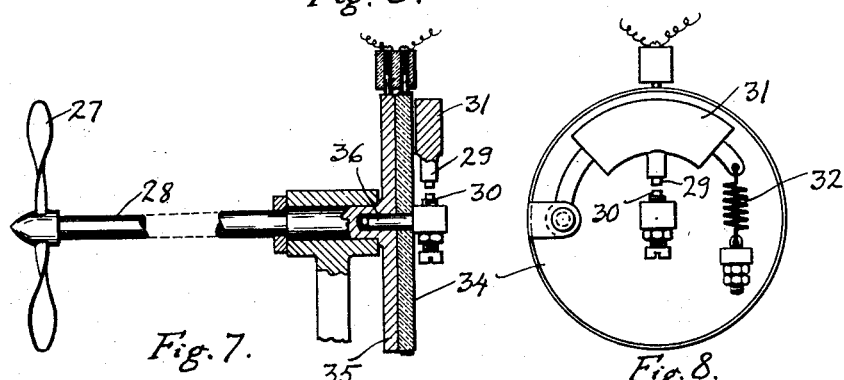
Fig. 7 is a sectional elevation of a propeller operated circuit closing and opening switch.
Fig. 8 is an end elevation of the switch, Figure 7.

In Figures 7 and 8 an automatically operating switch is illustrated. A propeller 27 on a shaft 28 projecting from the airplane is rotated by the current of air, and the centrifugal force will keep contacts 29, 30 separated as long as the contact piece 31 moves with a certain speed, if however the revolutions of the propeller fall below a certain point determined by a spring 32, contacts 30, and 29 will engage and close a circuit in which a battery 33 and motor 22 are located and the motor will be started to turn the drum and by means of the cables thereon open the parachute.

The switch is composed of a disc 34 of bakelite or other insulating material and a metal disc 35 connected to contact 30 by means of a stem 36.

To prevent breakage it is necessary that the motor be stopped as soon as the parachute is either fully opened or closed.

Figure 6:
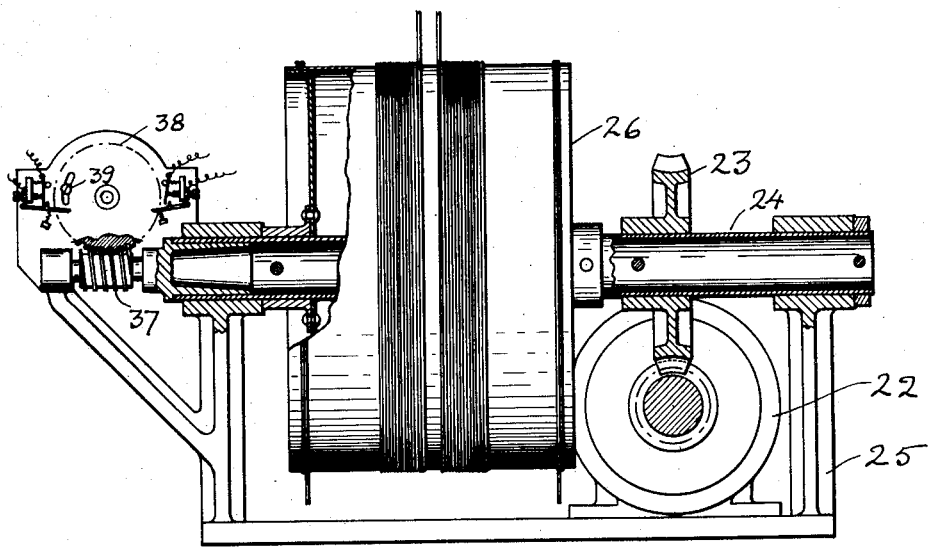
Fig. 6 is a side elevation of the automatic parachute opening and folding mechanism, partly in section.
Figures 9, 10:
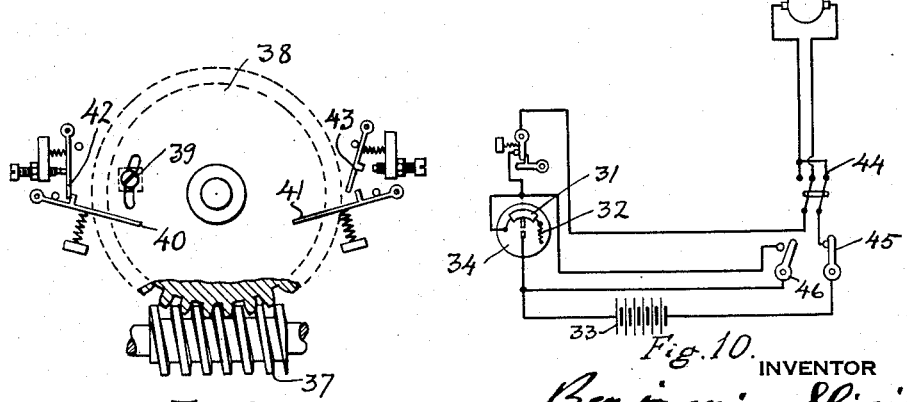
Fig. 9 is a detail view of a cut off switch on an enlarged scale.
Fig. 10 is a wiring diagram.

For this purpose an automatic cut off is provided as illustrated in Figures 6 and 9, a worm 37 on the drum shaft is engaged by a small worm drive wheel 38 making preferably less than one revolution and adjustable by means of a stop mechanism 39, so as to trip the spring controlled trips 40, 41, and 42, 43 and open the motor circuit at the moments at which the parachute is either fully opened or fully closed.

In the diagram Figure 10 is shown a reversing switch 44 to reverse the motor if it is desired to close the parachute, a ground switch 45 to be operated when the plane is on the ground, and a hand operated switch 46 to be operated by hand in case the automatic switch fails to operate.

The operation of the parachute will be entirely clear from the above description by having simultaneous reference to the drawings, and it will be clear that inasmuch as the curve in the inflated position of the parachute is longer than the straight line assumed by the parachute when folded, a certain amount of slip between the parts 14 and 15 of the parachute will take place when being inflated. This is made possible by overlapping of fabric, by slipping of brackets 13 and by making the arms 12 flexible. On account of the possibility to allow the parachute to assume a natural parachute shape, the arms 12, ring 18 and struts 20 as well as the entire structure can be made as light as possible. It will be clear that with a non-flexible construction of the parachute arrangement the same would become too heavy to be practical for airplanes and I have avoided this disadvantage by my flexible construction.

The normally closed parachute will be opened by the motor upon the closing of the motor circuit in which the contacts 29 and 30 are located as soon as the revolutions of the propeller 27 fall below a certain speed limit determined by spring 32 to keep the plane aloft or brake its descent. Breakage of the parts will be avoided by opening the motor circuit automatically at the switches 40, 42 and 41, 43. If the parachute is to be closed again as soon as the plane has found its equilibrium the motor circuit is closed at the reversing switch 44.

It will be understood that the above description and the drawings to which it refers illustrate examples only of the invention, and that changes may be made therein as come within the scope of the appended claims without departure from the spirit of the invention.

Having thus described the invention what is claimed as new and desired to protect by Letters Patent is:

1. A parachute operating apparatus for use on a flying machine said apparatus comprising a power operated winding mechanism for the parachute shroud lines, a shaft adapted to be supported on said flying machine and to extend outwardly through the fuselage and having a wind motor mounted thereon, an automatically operating device for controlling the operation of said winding mechanism, said device comprising centrifugally operated means to apply power to said winding mechanism to unwind said shroud lines upon a predetermined reduction in air speed and consequent reduction of speed of said air motor substantially as and for the purpose set forth.

2. A parachute operating apparatus for use on a flying machine said apparatus comprising a motor operated cable drum for the parachute shroud lines, a shaft adapted to be supported on said flying machine and to extend outwardly through the fuselage and having a wind motor mounted thereon, an automatically operating switch mechanism for controlling the operation of said motor operated cable drum, said switch mechanism comprising a metal disk on said shaft, a weight mounted for rotation with said disk and movable radially with respect thereto, a spring attached to said weight for restraining said radial movement, contact members carried by said weight and said metal disk and arranged in a circuit incorporating the motor of said cable drum, said contacts being kept normally apart by centrifugal force during the rotation of said shaft by said wind motor above a predetermined speed of rotation, and limit stop means actuated from said drum and arranged in the motor circuit to cut off the power to said motor operated drum as soon as the parachute is either fully open or closed.

BENJAMIN SLIPIKAS.